Jan. 13, 1953 J. HIRSCH 2,625,408
ACCOUNTING DEVICE
Filed Jan. 5, 1950 2 SHEETS—SHEET 1
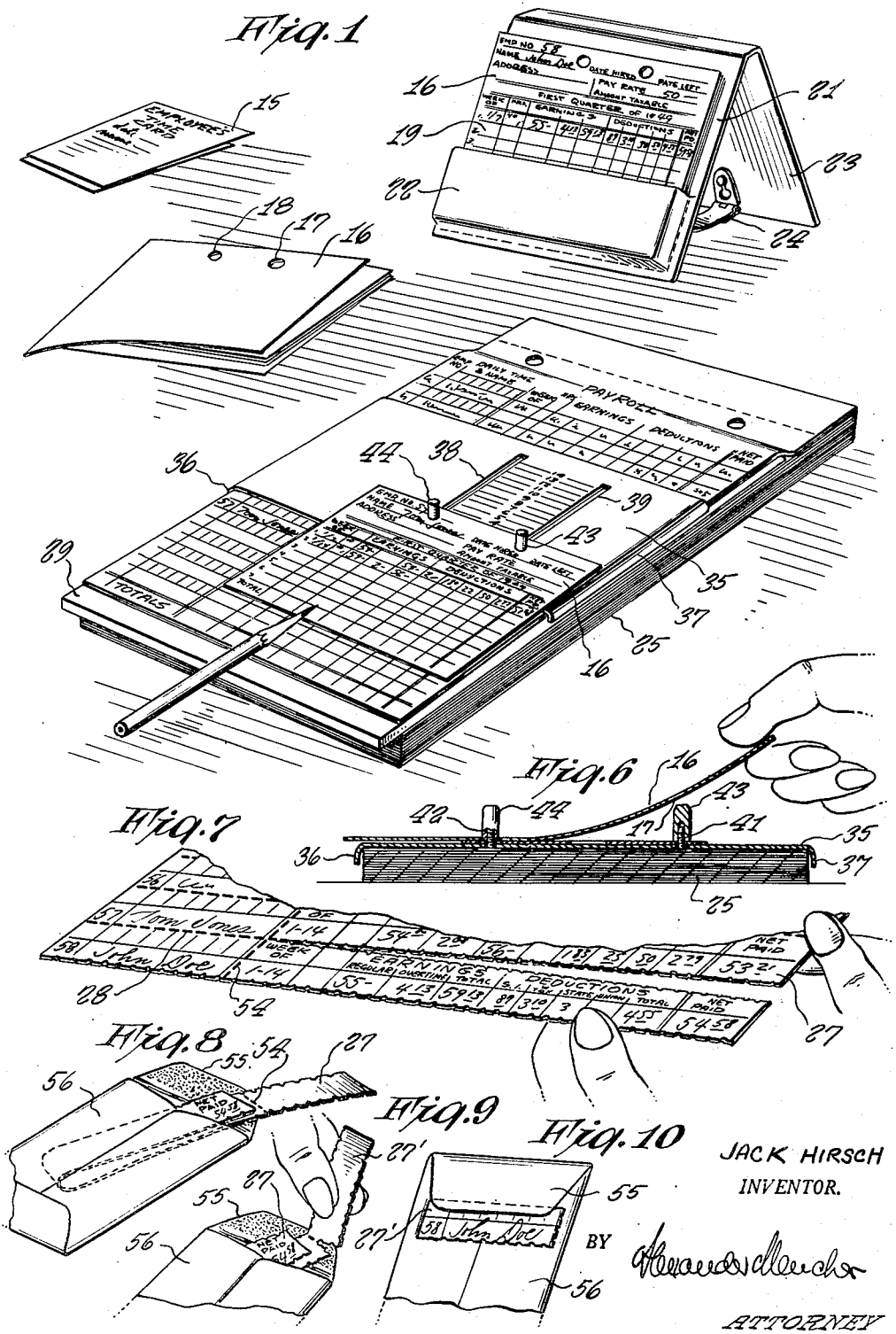
JACK HIRSCH
INVENTOR.

Jan. 13, 1953 J. HIRSCH 2,625,408
ACCOUNTING DEVICE
Filed Jan. 5, 1950 2 SHEETS—SHEET 2
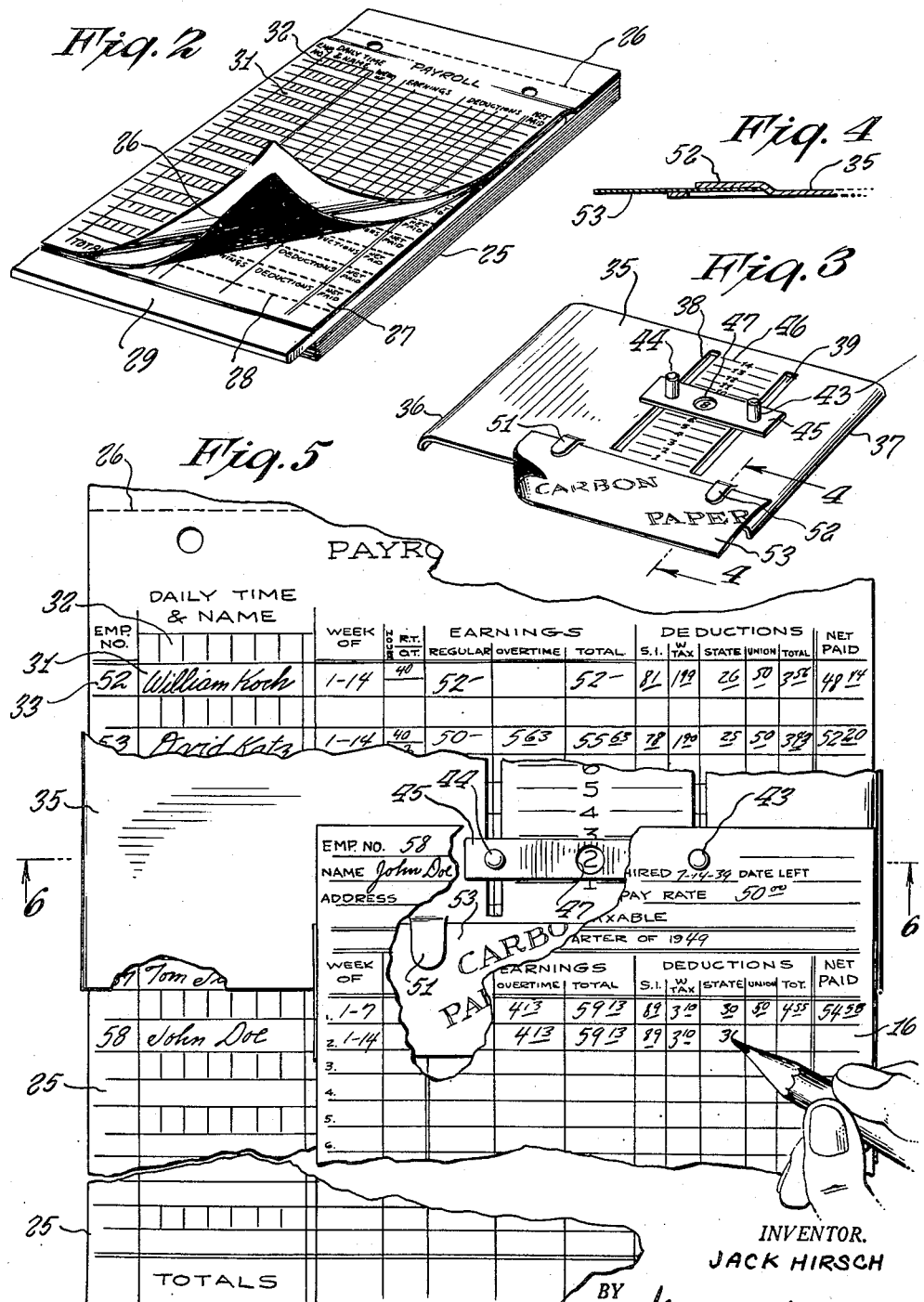
INVENTOR.
JACK HIRSCH
BY
ATTORNEY Patented Jan. 13, 1953

2,625,408

UNITED STATES PATENT OFFICE 2,625,408

ACCOUNTING DEVICE

Jack Hirsch, Mamaroneck, N. Y.

Application January 5, 1950, Serial No. 136,997

3 Claims. (Cl. 282—8)

This invention relates to an accounting device.

It is an object of the present invention to provide an accounting device wherein a plurality of operations is effected with one writing and which is particularly adapted for use in the handling of pay rolls wherein with the earnings record available the transfer of the figures can be readily made onto a journal pad and upon a record form for the employee, the latter being available to be placed in the employee's envelope.

It is another object of the present invention to provide a pay roll accounting device which saves accounting costs, avoids errors and saves time by eliminating transcribing operations, provides an integrated pay roll data arrangement and saves time when preparing federal and State tax returns.

It is another object of the present invention to provide an accounting device which can be adjusted readily for the different earning periods and which provides a carrier for employees' earning records so that they will be promptly aligned for the adding of further information which, when so done, places the information not only upon the employee's record sheet, but upon the main pay roll and upon the employee's slips, and wherein there is provided upon the device simple means for retaining a carbon paper which will lie between the employee's record forms and the journal pay roll forms.

Other objects of the present invention are to provide an accounting device which is of simple construction, inexpensive to manufacture, convenient to use, of pleasing appearance, consumes little space, and efficient in operation.

For other objects and for a better understanding of the invention, reference may be had to the following detailed description taken in connection with the accompanying drawing, in which Fig. 1 is a collective and perspective view of the device and of the various forms which are used therewith.

Fig. 2 is a perspective view of the journal pad and employees' record slips with carbon sheet and backing board.

Fig. 3 is a perspective view of the adjustable metal device adapted to be fitted over the journal pad and with a strip of carbon paper attached to the lower edge.

Fig. 4 is a fragmentary sectional view taken on line 4—4 of Fig. 3.

Fig. 5 is an enlarged fragmentary view looking in plan upon the device and upon the record forms assembled upon the same.

Fig. 6 is a transverse sectional view taken on line 6—6 of Fig. 5.

Fig. 7 is a perspective view of employees' record slips illustrating the manner that they are torn for insertion into the employees' envelopes.

Figs. 8, 9 and 10 are respectively perspective views of pay roll envelopes showing the manner in which the employees' record slips are attached to and inserted within the same.

Referring now to the figures, 15 represents an employee's time card on which the employee's time can be taken. This card may record the time for a given period, such as a week. With this data available each week, it can be transferred to earnings record forms 16 of the given employee. These earnings record forms have spaced holes 17 and 18 therein and have sufficient lines 19 for the entry of the different weekly earnings and deductions. One of these earnings record forms 16 can be provided for each quarter of the year.

An easel 21 having a pocket 22 can be provided for supporting a group of these earnings record forms in the manner as shown in Fig. 1. This easel can contain several of the forms depending upon the number of employees. The easel will be held in an upright position by the folding back of cover 23 and securing the same with a strap 24.

A journal pad for the pay roll is provided and is constructed as shown at 25 in Fig. 2. Each pay roll can be torn along a line 28 from the pad. The top sheet of the pay roll journal is lifted, as shown in Fig. 2, and a carbon 26 is placed thereunder. Under this carbon there is placed the individual statements 27 which can be torn along lines 28 thereof for insertion in the envelope of the employee in the manner to be described. Under the individual statements there is disposed a board 29 to prevent the printing through onto the second journal pad form.

The journal pad form has a column 31 for the employees' names. Above each space for the name are seven small boxes 32 for recording the daily hours, if desired. The employee's number can be disposed, as indicated at 33, in the small box at the edge of the form sheet. Opposite the name there is space for the indication of the week, the hours regular and overtime, the earnings, the deductions and the net amount paid, Fig. 5.

With the pay roll pad made up as shown in Fig. 2, mounting plate 35 is disposed thereover. The mounting plate has down turned side edges, as indicated at 36 and 37, to guide the movement over the journal pad.

In the mounting plate are vertically extending parallel slots 38 and 39 which contain clamping screws 41 and 42 that are held to the under face of the mounting plate when hand nuts 43 and 44 are respectively turned on the screws and upon a guide plate 45 that can be adjusted to the different line indications 46. These line indications have numerals indicating the earning period or week and the number of these lines so disposed on the plate is equal to the number of working weeks in a given quarter. The indicating plate 45 has a hole 47 therein through which a numeral can be observed. If the pay week is the eighth week of the quarter, the plate 45 will be located as shown in Fig. 3. For the following pay week, the plate would be adjusted to the next indication, as indicated by the numeral "9." With the mounting plate in place, it is adjusted upon the pad so that its lower edge is aligned with the name box being filled in.

The mounting plate has two prongs near the bottom edge thereof, as indicated at 51 and 52, in which a carbon strip 53 is inserted. The carbon strip extends only partially across the journal sheet to the name column and to the right edge of the mounting plate.

Over the hand nuts 43 and 44 there is disposed the earning record form 16 as they are taken out of the easel 21 in order and with the hand nuts extending through holes 17 and 18 respectively.

These earnings record sheets have similar listings to the pay roll journal sheet and become aligned with such listings so that upon entries being made upon the sheets 16, they will, through the small carbon paper piece 53, be transcribed onto the pay roll journal sheet. At the same time, the name of the employee can be taken from the earning record form 16 and inserted in the name column of the journal sheet. When the new earning record form 16 for the different employee is placed upon the hand nuts 43 and 44, the mounting plate 35 with the new earning record sheet 16 is adjusted to the next name entry on the journal sheet. In this manner, the pay roll sheet is made up. One earning record form is handled at a time and one after the other until the entire pay roll has been made.

When the complete pay roll has been made up, the sheet 25 thereof can be removed and likewise the employee's or individual's statement card can be taken from under the carbon 26 and can be severed in the manner as shown in Fig. 7.

The statements 27 can then be folded in the manner as shown in Fig. 8 and the end part bearing the name torn along line 54 and this part thereof, as indicated at 27', is glued with the flap 55 of envelope 56 to retain the same in the manner as illustrated in Fig. 10. The employee will have a complete record which is made up simultaneously with the making up of the pay roll sheet and of the earnings record form.

By this pay roll procedure, the lists of names of the active employees show regular and overtime hours worked, gross earnings, deductions and net pay. The individual's earnings records shows itemized earnings and deductions for the entire year by quarters. It simplifies preparation of withholding receipts and tax returns, social security returns, State information returns and so forth. Visible past earnings history provides for spot checking. Personnel data is conveniently arranged for easy reference.

The pay envelope identification stub is prepared without recopying means, clock number or other data. The statements of earnings and deductions are required by the wage-hour law is prepared simultaneously with the other forms.

The mounting plate is preferably made of stainless steel and fits over the carbon-interleaved pad containing the summary sheets and the perforated individuals' statements of earnings. The operator merely places each employee's earnings record in turn on the positioning pins of the mounting plate and posts, moving the plate down on line of summary journal sheet after each entry.

After completion, the individuals' earning records are returned to the folder easel, the pay roll summary sheets are filed in loose leaf binders and the statement of earnings of the individual employees are separated along their perforations. These statements, in turn, are separated into two parts, one being the pay envelope insert or check stub containing the figures, and the other part being the pay envelope identification stub that is secured to the envelope with the flap when sealing.

The pins of the mounting plate are adjustable for weeks of the calendar quarter. The positioning pins are given one adjustment for each pay period.

It should now be apparent that there has been provided a systematic handling of the pay roll which saves time and which prevents the making of the usual transcribing errors .

While various changes may be made in the detail construction, it shall be understood that such changes shall be within the spirit and scope of the present invention as defined by the appended claims.

What is claimed is:

1. An accounting device comprising a mounting plate adapted to be extended across a main accounting sheet, slidable means adjustable upon the mounting plate and adapted to be fixed in any one of a plurality of positions, said slidable means having a projection thereupon adapted to receive another accounting sheet whereby this other accounting sheet can be brought into proper alignment with the one accounting sheet on which the mounting plate is disposed, said slidable means on the mounting plate comprising a transversely extending bar, said mounting plate having parallel slots, clamping screws extending through the slots respectively and through the bar, hand nuts on the respective screws adapted to tighten the bar and screws upon the mounting plate and said hand nuts adapted to serve as positioning pins for the second accounting sheet.

2. An accounting device comprising a mounting plate adapted to be extended across a main accounting sheet, slidable means adjustable upon the mounting plate and adapted to be fixed in any one of a plurality of positions, said slidable means having a projection thereupon adapted to receive another accounting sheet whereby this other accounting sheet can be brought into proper alignment with the one accounting sheet on which the mounting plate is disposed, and attaching means disposed along the lower edge of the mounting plate for the connection thereto of a carbon sheet and adapted to lie beneath the second accounting sheet and the first accounting sheet, said slidable means on the mounting plate comprising a transversely extending bar, said mounting plate having parallel slots, clamping screws extending through the slots respectively and through the bar, hand nuts on the respective screws adapted to tighten the bar and screws upon the mounting plate and said hand nuts adapted to serve as positioning pins for the second accounting sheet.

3. An accounting device comprising a mounting plate having down turned guide edges and adapted to fit over a pad of accounting sheets and having an edge adapted to be aligned with the spacings of the accounting sheets, said mounting plate having laterally spaced guide slots, a positioning plate adjustable in the guide slots, means for fixing the plate in any one of its adjusted positions, said means for fixing the plate including screws extending through the slots and hand nuts adjustable upon the screws and engaging the plate, said hand nuts providing positioning pins adapted to receive a second accounting sheet whereby upon the second accounting sheet being placed upon the mounting plate an alignment can be made of the same and of its spacings with the spacings of the first mentioned accounting sheet.

JACK HIRSCH.

REFERENCES CITED

The following references are of record in the file of this patent:

UNITED STATES PATENTS

| Number | Name | Date |
| --- | --- | --- |
| 762,938 | Phelps | June 21, 1904 |
| 861,228 | Turck | July 23, 1907 |
| 898,460 | Gray | Sept. 15, 1908 |
| 1,331,567 | Johnson | Feb. 24, 1920 |
| 1,486,378 | Hirsch | Mar. 11, 1924 |
| 2,117,372 | Smith | May 17, 1938 |
| 2,163,193 | Critchfield | June 20, 1939 |
| 2,311,052 | Hurup | Feb. 16, 1943 |
| 2,381,197 | Zalkind | Aug. 7, 1945 |
| 2,440,337 | Hosmer | Apr. 27, 1948 |
| 2,485,513 | Straus | Oct. 18, 1949 |
| 2,523,803 | Adams | Sept. 26, 1950 |